United States Patent
Bruillot et al.

(10) Patent No.: US 12,361,833 B2
(45) Date of Patent: Jul. 15, 2025

(54) SECURE TRANSFER SYSTEM FOR DIGITAL AIRCRAFT DATA, DATA PRODUCER SYSTEM, DATA CONSUMER SYSTEM, AND RELATED TRANSFER METHOD

(71) Applicant: DASSAULT AVIATION, Paris (FR)

(72) Inventors: Serge Bruillot, Saint Cloud (FR);
Patrick Dignimont, Saint Cloud (FR);
Jérôme Cappelle, Saint Cloud (FR)

(73) Assignee: DASSAULT AVIATION, Paris (FR)

( * ) Notice: Subject to any disclaimer, the term of this patent is extended or adjusted under 35 U.S.C. 154(b) by 410 days.

(21) Appl. No.: 17/574,659

(22) Filed: Jan. 13, 2022

(65) Prior Publication Data
US 2022/0223051 A1    Jul. 14, 2022

(30) Foreign Application Priority Data

Jan. 13, 2021  (FR) .................................. 21 00285

(51) Int. Cl.
*G06F 21/64*    (2013.01)
*B64D 45/00*    (2006.01)
(Continued)

(52) U.S. Cl.
CPC .............. *G08G 5/20* (2025.01); *B64D 45/00* (2013.01); *H04W 12/06* (2013.01); *H04W 74/002* (2013.01); *H04W 76/11* (2018.02)

(58) Field of Classification Search
CPC ..... G08G 5/0004; B64D 45/00; H04W 12/06; H04W 74/008; H04W 76/11; H04L 63/0428; G06F 21/64
See application file for complete search history.

(56) References Cited

U.S. PATENT DOCUMENTS 10,791,125 B2    9/2020  Samhan et al.
2011/0055564 A1  3/2011  Porsch et al.
(Continued)

FOREIGN PATENT DOCUMENTS

CN    102124680 B    8/2015
CN    106850377 A    6/2017
CN    110198202 A    9/2019

OTHER PUBLICATIONS

Search Report for priority application FR 892508.
(Continued)

*Primary Examiner* — Maher N Algibhah
(74) *Attorney, Agent, or Firm* — Davidson Kappel LLC

(57) ABSTRACT

A secure transfer system for digital aircraft data includes a data producer system configured to generate a data capsule at each data production and a data consumer system. The consumer system is configured to retrieve each capsule to extract an identifier, a refresh indicator, a functional data packet, and an integrity control result. It is configured to check the integrity of the data in the capsule by establishing a new integrity check result from the identifier, the refresh indicator, and the functional data packet retrieved from the capsule and comparing the new integrity check result to the integrity check result of the capsule. The data capsule is in an integrity state when the new integrity check result matches the integrity check result retrieved from the capsule.

16 Claims, 6 Drawing Sheets

(51) Int. Cl.
    *G08G 5/20*         (2025.01)
    *H04W 12/06*      (2021.01)
    *H04W 74/00*      (2009.01)
    *H04W 76/11*      (2018.01)

(56) References Cited

U.S. PATENT DOCUMENTS

| | | |
|---|---|---|
| 2011/0162081 A1 | 6/2011 | Lopez et al. |
| 2013/0208630 A1 | 8/2013 | Bobrek |
| 2021/0306227 A1* | 9/2021 | Atighetchi ............ H04L 63/107 |

OTHER PUBLICATIONS

Abaco Systems: "AFDX/ARINC 664 Protocol—White Paper", White Papers of Abaco Systems, Jan. 1, 2016, URL:https://www.abaco.com/system/files/files/afdx-arinc_664_protocol_a-wp-604a.pdf.

\* cited by examiner

SECURE TRANSFER SYSTEM FOR DIGITAL AIRCRAFT DATA, DATA PRODUCER SYSTEM, DATA CONSUMER SYSTEM, AND RELATED TRANSFER METHOD

The present disclosure relates to an aircraft data transfer system, comprising:
- a data producer system able to produce first data at successive moments;
- at least one data consumer system able to receive and use the data produced by the data producer system;
- with at least one of the data producer system and the or each data consumer system being installed in an aircraft;
- a data transfer link between the data producer system and the or each data consumer system.

The data transfer system is intended to ensure secure transfer of digital data within an aircraft, from the aircraft to at least one data consumer system external to the aircraft (such as at least one other aircraft, a ground control station in the case of a UAV, etc.), and/or from a data producer system external to the aircraft (such as another aircraft, a mission preparation system, a data download system, etc.) to the aircraft.

It is intended to be used in particular between a data producer system and one or more data consumer systems located at a distance from each other. The data transfer system can also be used within the same aircraft system, in particular between different computers of the same aircraft system, between an application producing equipment such as a sensor and one or more computers, between several application layers of the same computer, or between different cores of the same processor.

The transfer system is intended to be implemented independently of the number of digital data transfer links between each data producer system and each data consumer system and independently of the nature of these links in the overall data transmission architecture.

BACKGROUND

In an aircraft, many aircraft systems are able to generate functional data. This is the case with systems for measuring sensor parameters, for example, with the parameters internal or external to the aircraft or avionics systems, in particular aircraft piloting, control or guidance systems.

The functional data is aircraft parameter measurements, aircraft system control commands or aircraft systems tracking data, for example.

The functional data is often used by other aircraft systems, or by other application layers of the same aircraft system. They are therefore transferred between a data producer system and at least one data consumer system that may be located remotely, or even outside the aircraft or in other application layers.

Digital data transfer protocols are widely used within aircraft.

Some "low-level" protocols transmit digital data in the form of data words, each of which contains protocol management and functional information. This is the case with the ARINC429 protocol, for example.

More advanced protocols, such as the GAM-T-101 protocol (Digibus), the MIL-STD-1553B protocol, or the Ethernet protocol and its so-called deterministic derivatives (ARINC664 Part 7 or SAE AS6802 or TSN) implement messages that enable the atomic transmission of several data words, some of which contain exclusively protocol management information and others exclusively functional information.

In all cases, ensuring the integrity of the transmitted data is essential in the aeronautical field.

In the example of the ARINC429 protocol, the functional data is transmitted as a sequence of bits via ARINC429 words, whose size is limited to 32 bits.

Each ARINC429 word includes a data identifier (ID) called a label, an identifier of the source that issued the data (SDI), the functional data (D), and a validity identifier of the data issued by the producer system (SSM).

The ARINC429 protocol facilitates the transmission of so-called functional data in the form of data labeling and, in the following, as commonly used, "label" may refer to the full ARINC429 word.

To verify functional data integrity after transmission, each ARINC429 word also includes a parity check bit (P), resulting from the binary sum of the functional data bits. The parity bit is calculated when encoding the data into ARINC429 words in the data transmission layer.

When retrieving the data contained within an ARINC429 word, the consumer system is able to recalculate the parity of the functional data it receives and verify that it is identical to the parity bit contained in the ARINC429 word.

Nevertheless, this integrity test is often an insufficient indicator for seeing an integrity loss in functional data packet during the transfer.

Thus, if two bits of the functional data packet are erroneous, the sum may yield a parity corresponding to that of the check bit, while the functional data packet has been doubly corrupted.

Such a protocol can therefore be used when the data being transmitted is less important or not critical to the safety and operation of the aircraft.

If the data is important or critical, it is necessary to use redundant producing systems that elaborate data in parallel and transmit them in parallel to one or more consuming systems. The consuming system(s) receive(s) the data from the different producing systems and applies selection or voting strategies to ensure data integrity. Such a solution is safe, but increases the mass, the cost and the complexity of the aircraft.

SUMMARY

One object of the present disclosure is to provide an aircraft data transfer system between a functional data producer system and at least one system consuming such data that is simple and easily adaptable to an existing data transfer protocol, and which is sufficiently secure in the event that an error in this data could have catastrophic consequences.

To this end, the present disclosure provide a data transfer system as defined above, where the data producer system is configured to generate, at each data generating, a data capsule, each data capsule comprising an identifier of the data producer, a refreshment indicator updated at each data production, possibly a functional data packet, and a result of the data integrity check relating to at least the identifier, the refresh indicator and possibly the functional data packet;
- each data capsule being able to being transferred to the or each data consumer system via the transfer link;
- the or each data consumer system being able to retrieve each data capsule to extract the identifier, the refresh indicator, optionally the functional data packet, and the integrity check result, and to check the integrity of the data in the data capsule by establishing a new integrity check result from at least the identifier, the refresh indicator and optionally the functional data packet retrieved from the data capsule and by comparing the new integrity check result to the integrity check result retrieved from the data capsule, the data capsule being in an integrity state when the new integrity check result matches the integrity check result retrieved from the data capsule.

The system according to the present disclosure may include one or more of the following features, taken alone or in any technically feasible combination:

- each data capsule comprises a functional data packet, the integrity check result of the capsule data relating to at least the identifier, the refresh indicator and the functional data packet, the or each data consumer system being able to extract the functional data packet and to check the data integrity of the data capsule by establishing a new integrity check result from at least the identifier, the refresh indicator and the functional data packet;
- the or each data consumer system is able to compare the identifier received in each data capsule with a predefined identifier, on a semantic or a mapping table basis, to deduce at least one content characteristic of the data capsule;
- the data producer system issues data capsules of fixed size, the or each data consumer system being able to determine the size of the data capsule, the size and/or the position of the identifier, the refresh indicator, possibly the functional data packet or/and the integrity check result in the data capsule from a semantic or a mapping table linking the predefined identifier to the size of the data capsule, to the size and/or the position of the identifier, the refresh indicator, possibly the functional data packet and/or the integrity check result in the data capsule;
- for each data capsule received, the or each data consumer system is able to determine a refresh increment from the refresh indicator of the data capsule and from the refresh indicator of a previously received data capsule, the or each data consumer system being able to determine a data capsule refresh state, between an expected refresh state and an inadequate refresh state, depending on the refresh increment and depending on the capsule production frequency, the capsules transfer and/or receiving frequency;
- from the capsule identifier, the or each data consumer system is able to verify that the data producer system that issued the data capsule is the data producer system expected to issue the data capsule, the or each data consumer system being able to put the data capsule into a valid state that allows the use of the data it contains when the data capsule comes from the expected data producer system, is in the integrity state, and is in the expected refresh state;
- the or each data consumer system is able to put into the invalid state a data capsule that does not come from the expected data producer system, which is not in the integrity state or which is not in the expected refresh state and to keep data capsules that follow a data capsule placed in the invalid state in the invalid state, the or each data consumer system being able to return at least one data capsule following a plurality of capsules held in the invalid state to the valid state when the data capsules held in the invalid state come from the expected data producer system, are in the integrity state and in the expected refresh state for a predefined reset period;
- the transfer link implements a word generating transfer protocol, with each data capsule being transmitted by using a plurality of words;
- the plurality of words contains:
  at least one identification word comprising the identifier and/or the refresh indicator;
  optionally at least one functional data word containing functional data of the functional data packet;
  at least one integrity check word, containing the integrity check;
- the plurality of words comprises at least two distinct integrity check words, each integrity check word containing a part of the integrity check result;
- the data producer system is able to produce the integrity check result by adopting a memory representation from the data to be distributed in the words intended for transferring the data capsule, with the or each data consumer system able to reconstitute the memory representation processed by the data producer system from the data retrieved from the data capsule words; and wherein optionally each word includes transfer protocol characteristic fields, at least some of the data in the transfer protocol characteristic fields being substituted or deleted in the memory representation;
- the capsule transfer frequency or the capsule receiving frequency is higher than the capsule generation frequency, the data consumer system being able to keep at least one data capsule in an expected refresh state even if the refresh increment is zero;
- if the capsule processing frequency or the capsule transfer frequency is greater than the capsule receiving frequency, the data consumer system is able to place at least one data capsule in an expected refresh state even if the refresh increment is greater than 1;
- the integrity check result is a checksum or cyclic redundancy code.

The present disclosure also provides a data producer system for an aircraft data transfer system, the data producer system being able to produce data at successive moments;
  the data producer system is configured to generate a data capsule at each data production, each data capsule comprising an identifier of the data producer, a refresh indicator updated at each data production, possibly a functional data packet, and a result of the data integrity check relating to the identifier, the refresh indicator and possibly the functional data packet;
  each data capsule being able to being transferred to a data consumer system via a transfer link.

The present disclosure also relates to a data consumer system intended to be used in an aircraft data transfer system, the or each data consumer system being able to receive data capsules, each data capsule comprising an identifier of the data producer, a refresh indicator updated at each data production, possibly a functional data packet, and a result of the data integrity check relating to at least the identifier, the refresh indicator and possibly the data packet;
  each data capsule being able to being transferred to the data consumer system via the transfer link;
  the or each data consumer system being able to retrieve each data capsule to extract the identifier, the refresh indicator, possibly the functional data packet, and the integrity check result, and to check the integrity of the data of the data capsule by establishing a new integrity check result from at least the identifier, the refresh indicator and optionally the functional data packet retrieved from the data capsule and by comparing the new integrity check result to the integrity check result retrieved from the data capsule, the data capsule being in an integrity state when the new integrity check result matches the integrity check result retrieved from the data capsule.

The present disclosure also relates to an aircraft data transfer method comprising the following steps:
- processing of data by a data producer system, at successive moments;
- transferring the data by a data transfer link between the data producer system and the or each data consumer system;
- receiving and, after integrity check, using by the or each data consumer system, data produced by the data producer system;
- at least one of the data producer system and the or each data consumer system being on board an aircraft;

and further including the following steps:
- the data producer system generating a data capsule at each data production, each data capsule comprising an identifier of the data producer, a refresh indicator updated at each data production, possibly a functional data packet, and a result of the data integrity check relating to the identifier, the refresh indicator and possibly the functional data packet;
- transferring each data capsule to the data consumer system via the transfer link;
- the or each data consumer system retrieving each data capsule, to extract the identifier, the refresh indicator, possibly the functional data packet and the integrity check result, and
- the or each data consumer system checking the integrity of the data of the data capsule by establishing a new integrity check result from at least the identifier, the refresh indicator and possibly the functional data packet retrieved from the data capsule and by comparing the new integrity check result to the integrity check result retrieved from the data capsule;
- assigning the data capsule an integrity state when the new integrity check result matches the integrity check result retrieved from the data capsule.

The method according to the present disclosure may comprise one or more of the following features, taken alone or in any technically possible combination:
- the method comprises the or each data consumer system determining a refresh increment for each data capsule received, from the refresh indicator of the data capsule and from the refresh indicator of a previously received data capsule and the or each data consumer system determining a data capsule refresh state, the between an expected refresh state and an inadequate refresh state, depending on the refresh increment, the capsule generation frequency, the capsule transfer frequency and/or the capsule receiving frequency;
- the method comprises the or each data consuming system verifying from the capsule identifier that the data producer system that issued the data capsule is the data producer system expected to issue the data capsule, and placing the data capsule in a valid state for use of the data contained therein when the data capsule is from the expected data producing system, is in the integrity state and is in the expected refresh state.

BRIEF DESCRIPTION OF THE FIGURES

The present disclosure will be better understood upon reading the following description, given only by way of example, and made with reference to the appended drawings, in which.

DETAILED DESCRIPTION

Figure 1:
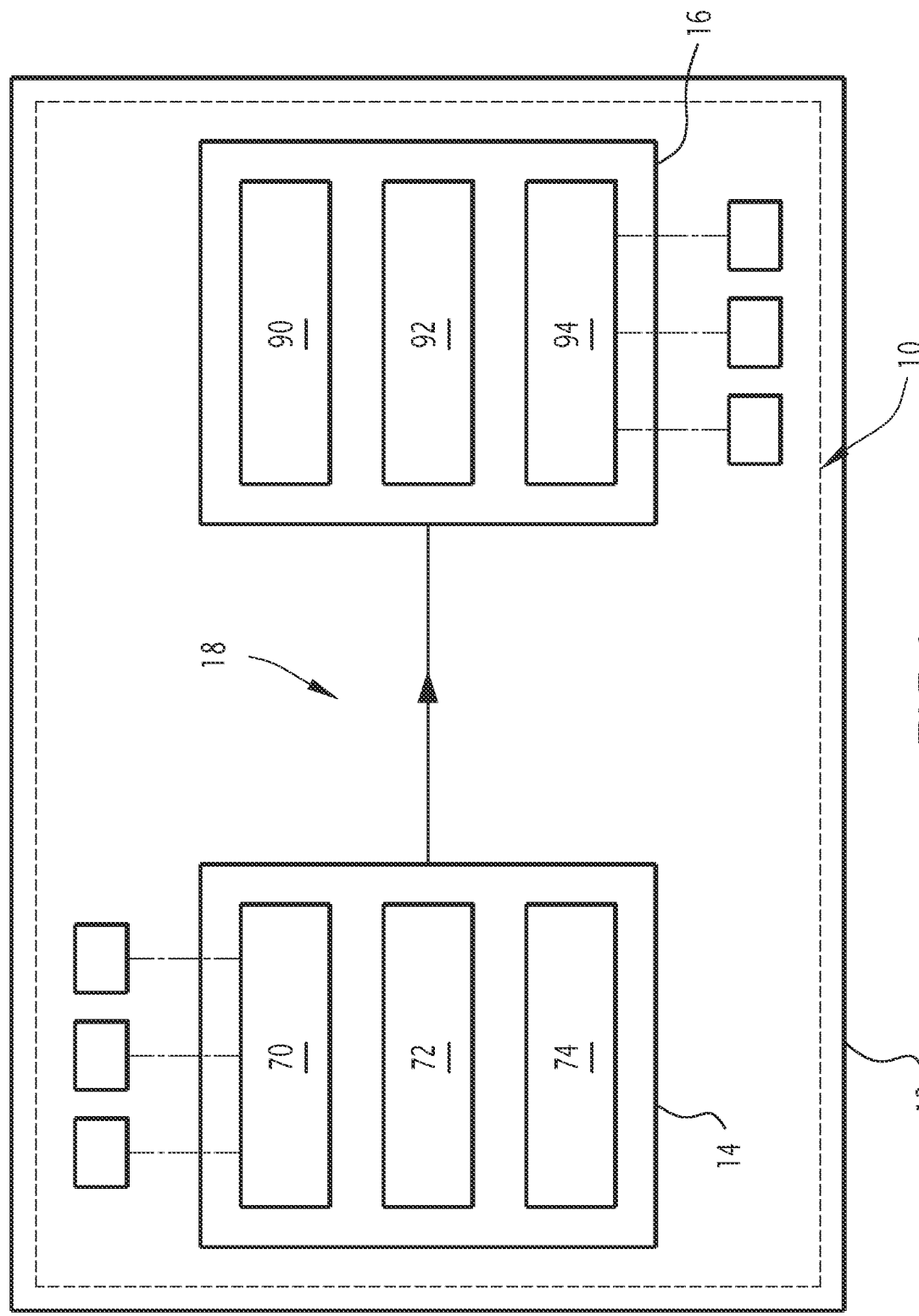
FIG. 1 is a schematic representation of an aircraft data transfer system according to the present disclosure.

A first data transfer system 10 according to the present disclosure within an aircraft 12 is illustrated schematically in FIG. 1.

The aircraft 12 is a business aircraft, a military aircraft, a passenger or cargo aircraft, or aerial drone vehicle, for example.

The data transferred by the system 10 is functional data produced or received in the aircraft, such as results of physical measurements of aircraft sensors, control command data of aircraft systems, status tracking data of aircraft systems or avionics data.

This functional data is transported and encoded in binary form as bit strings.

With reference to FIG. 1, the transfer system 10 includes a data producer system 14, at least one data consumer system 16 and a data transfer link 18 between the data producer system 14 and the or each data consumer system 16.

The data producer system 14 and the data consumer system 16 are present in two respective separate aircraft systems of the aircraft 12, for example. The data transfer link 18 is then a transmission link present in the aircraft 12, such as a physical data transmission link through a cable network.

In a variant, at least one data consumer system 16 is external to the aircraft 12, located in another aircraft, for example, a ground control station in the case of a UAV, etc.

In another variant, the data producer system 14 is external to the aircraft 12. It is located in another aircraft, for example, in a mission preparation system, in a data downloading system.

In the latter two cases, the data transfer link 18 includes at least one wireless data transmission link from the aircraft 12 and/or to the aircraft 12.

The data producer system 14 and the data consumer system 16 then each comprise at least one computing resource consisting of at least a processor and at least a memory containing software modules able to execute by the processor.

In a variant, the systems 14, 16 are made at least partially in the form of programmable logic components, or in the form of dedicated integrated circuits.

In one variant (not shown), the data producer system 14 and the data consumer system 16 are located within the same aircraft system, or even located together in the same aircraft system's computing resource at two separate application layers of the same aircraft computing resource, for example, or in two different cores of the same processor.

The data producer system 14 is able to produce functional data at successive moments by generating them itself or by receiving them from one functional data source.

Figure 2:
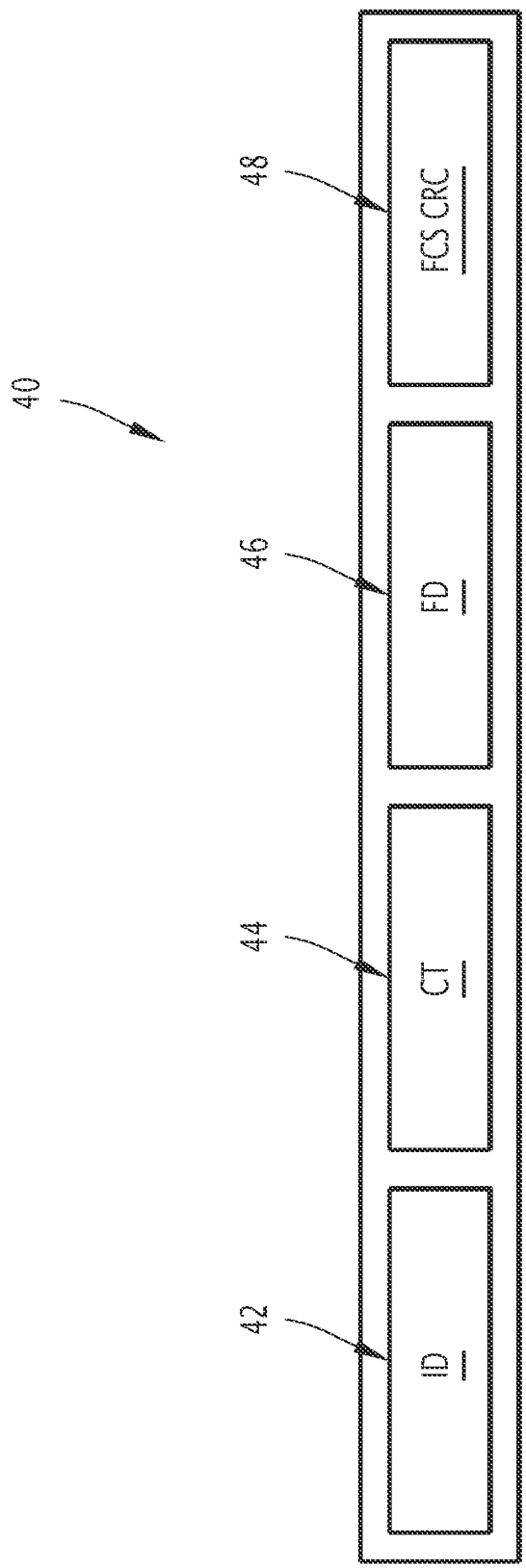
FIG. 2 is a schematic representation of the contents of a capsule used to transfer data within the transfer system of FIG. 1.
Figure 3:
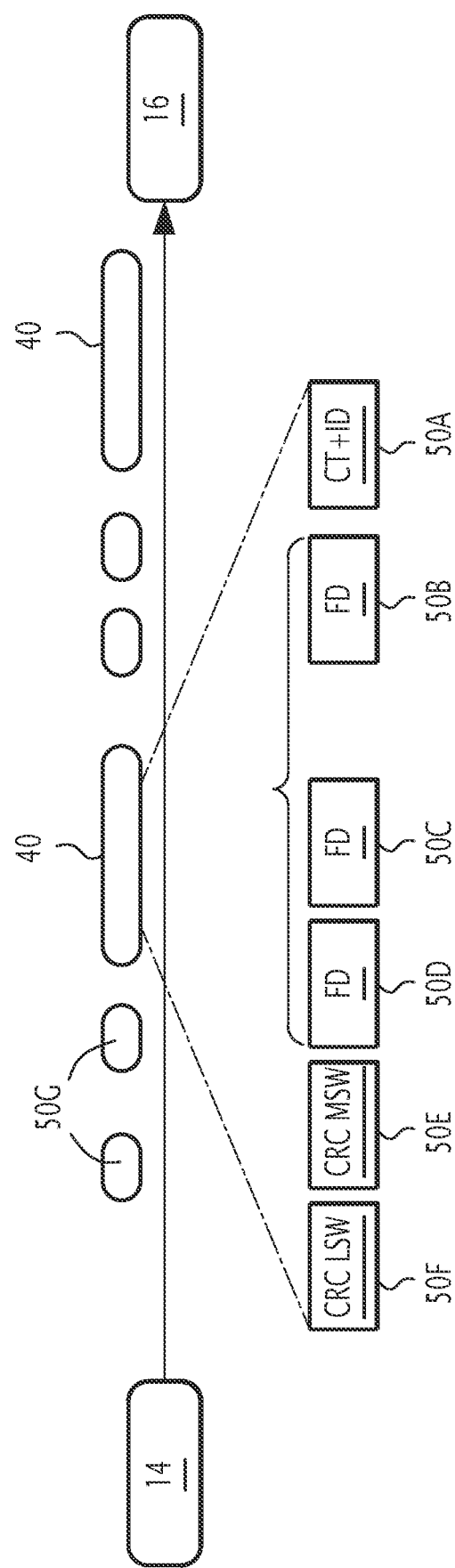
FIG. 3 is a schematic representation showing the structure of a capsule transmitted via a transmission protocol using words, in an example where the identifier and the refresh indicator are placed in the same word.

According to the present disclosure, the data producer system 14 is then able to transmit the processed data to the data consumer system 16 through the transfer link 18, encapsulating the first functional data processed at successive moments in successive capsules 40, the content and structure of which are illustrated in FIGS. 2 to 3 respectively.

As illustrated in FIG. 2, each capsule 40 includes a capsule identifier 42, a refresh indicator 44, updated by the first data producer system 14 at each processing of functional data, independent of the data transmission frequency in the transfer link 18, a functional data packet 46 developed by the first data producer system 14 during a functional data production and an integrity check result 48, computed by identifier 42, the refresh indicator 44 and from the functional data packet 46 of the capsule 40.

The capsule identifier 42 is a bit string for identifying the data producer system 14, for example, and/or an entity that produced the functional data within the data producer system 14. In particular, from a semantic and/or from a mapping table, the capsule identifier 42 allows the or each data consumer system 16 to identify the data producer and functional content of the data packet, and thus implement an authentication check to ensure that the data was indeed produced by the expected data producer system 14.

The capsule identifier 42 makes it possible to bijectively associate the capsule 40 to a given transfer system 10 (implemented in an aircraft 12, multiple aircraft, one or more aircraft, and means external to the aircraft 12), regardless of the number of transfer links 18 and the nature of those links in the overall transmission architecture.

It is thus possible, from the capsule identifier 42 associated with the capsule 40, based on predefined semantics and/or a mapping table, to assign the capsule 40 to a given transfer system 10 including a data producer system 14 and at least one data consumer system 16.

Further, if the capsules 40 generated by a data producer system 14 and/or an entity within the data producer system 14 are all of identical structures, the data consumer system 16 is able to identify the position of the data packet 46 within the capsule 40, the length of the data packet 46 and the position of the integrity check result 48, from the capsule identifier 42.

The refresh indicator 44 is a bit string encoding a functional data production order number at each functional data production. The refresh indicator 44 is a counter or countdown, for example, generally updated individually at each functional data production. It makes it possible to associate a data refresh measurement to each transmitted capsule 40. This measurement makes it possible to ensure that the functional data retrieved by the data consumer system 16 has been refreshed by the data producer system 14, constituting a refresh control.

The data packet 46 is a bit string encoding the functional data generated during the functional data production associate with the number of the refresh indicator 44.

The integrity check result 48 is a bit string encoding a check number calculated by mathematical processing, from a functional representation incorporating the identifier 42 of the capsule 40, the refresh indicator 44 of the capsule 40, and the functional data 46 of the capsule 40.

Preferably, the integrity check result 48 is the result of a checksum, or cyclic redundancy code (CRC). The mathematical processing is an algorithm, for example, chosen based on the security objectives to be achieved, the minimum/maximum length of the data packet 46, the identifier 42, the refresh indicator 44, and the reliability of the data link in terms of bit error rate (BER). Examples of the algorithms used are described in the United States Federal Aviation Administration document DOT/FA/TC-14/49, March 2015, available at:

https://www.faa.gov/aircraft/air_cert/design_approvals/air_software/media/TC-14-49.pdf.

In the example shown in FIG. 1, the data transfer link 18 is a link implementing a data transfer protocol using words 50 containing transmission protocol management information and functional information, as viewed from that protocol.

In a variant that will be described below, the data transfer link 18 is a link implementing a data transfer protocol using messages that make atomic transmission of multiple words 50 possible, some of which contain exclusively transmission protocol management information and others of which contain exclusively functional information, as seen from this protocol.

Figure 4:
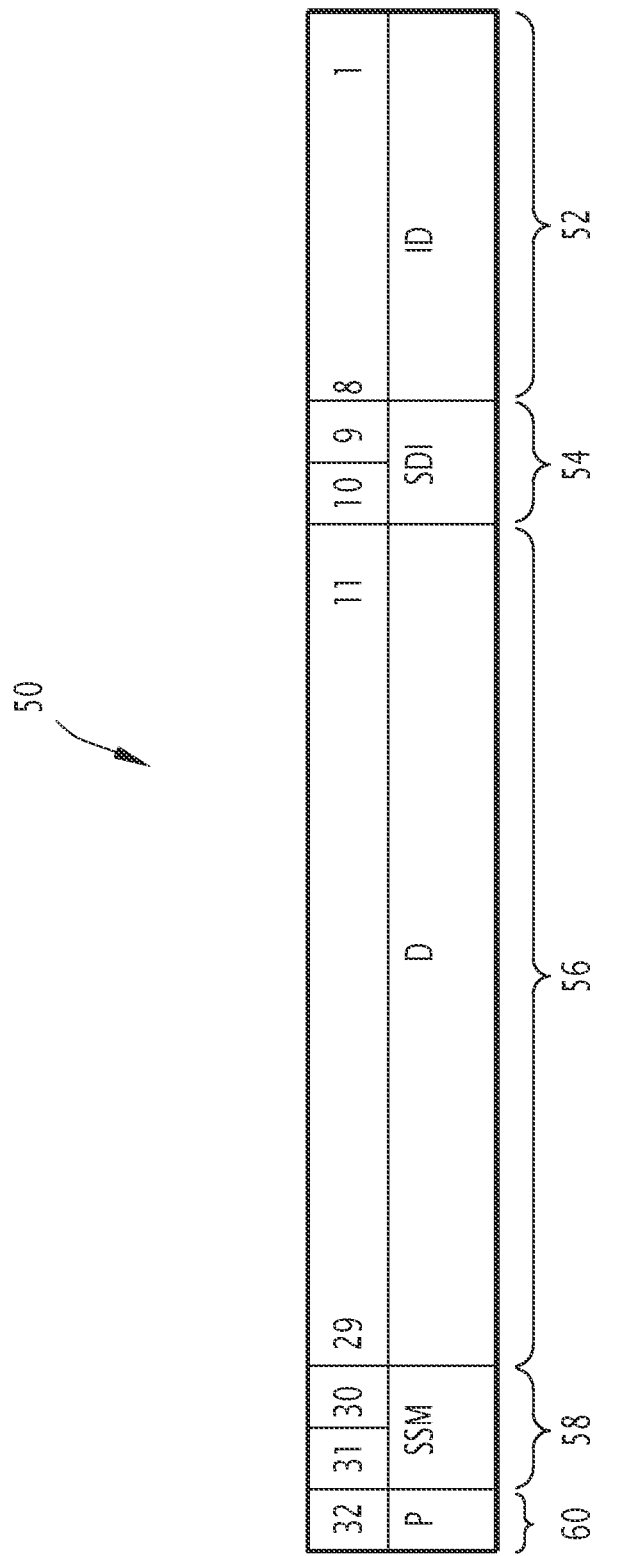
FIG. 4 is a detailed view of a word representation of the ARINC429 protocol.

An example data transfer protocol using words 50 is shown in FIG. 4, which is advantageously implemented in an ARINC429 link.

Each word 50 is defined by a bit sequence, having a predefined number of bits. The word 50 for ARINC429, has thirty-two bits. As explained above, it is commonly referred to as the "ARINC429 word" or "label".

The word 50 is broken down into separate fields. In the example shown in FIG. 4, the word 50 includes a field 52 for identifying the word (ID), and advantageously, a field 54 for identifying the receiver and/or subsystem that transmitted the data (optional SDI field in the ARINC429 standard). The word 50 also comprises a field 56 containing the data (D) carried by the word, a data validity (SSM) or sign/sense field (e.g. +/− or North/South, East/West), and a parity field (P) 60.

Field 52 contains an identification of the word, with normalized semantics defined during word processing.

Field 54 (optional) is generally intended to define which data receiver is intended for the word, or which transmitter subsystem transmitted the data.

Field 56 contains the data to be transmitted by word 50. In this example it has nineteen bits.

Field 58 contains an identifier that may be used to identify the validity of the data generated by the data producer system 14, to may identify whether the data producer system 14 considers the data to be valid or whether it considers it to be no longer valid.

The parity field 60 is a binary sum calculation of all bits in the fields 52, 54, 56, and 58 to determine the parity of the sum.

In the case where the transfer link 18 is a link implementing the words 50, the capsule size 40 is generally larger than the field size 56 of the data carried by a word 50.

As illustrated in FIG. 3, the capsule 40 is thus transmitted over a plurality of distinct words 50A through 50F by distributing the identifier 42, refresh indicator 44, functional data 46, and integrity check result 48 into the fields 56 of multiple words 50A through 50F.

Preferably, at least a first identification word 50A contains the identifier 42 of the capsule 40 and possibly, the refresh indicator 44. Advantageously, the word 50A contains both the identifier 42 of the capsule 40, and the refresh indicator 44.

In order to limit the bandwidth consumed, the identifier 42 of the capsule 40 is preferably formed by the field 52 identifying the word 50A, and by the field 54 identifying the receiver and/or the subsystem that transmitted the data. This is possible by establishing a mapping table between each capsule 40 and the successive identifiers of the words 50A to 50F used to transmit the capsule 40.

For example, if each capsule 40 corresponding to a functional data production is issued in N words 50, the N successive identifiers of the N words 50 are associated with the capsule 40.

The refresh indicator 40 is encoded in binary form in the field 56 of the word 50A, using 16 of the 19 bits available in the field 56, for example.

In a variant (not shown), the word 50A contains the identifier 42 of the capsule 40, in field 56, for example, and another identification word (not shown) separate from the word 50A contains the refresh indicator 44 in the field 56.

Depending on the size of the functional data packet 46 produced at each functional data production, the functional data packet 46 is issued on at least one functional data word 50B through 50D, typically on multiple functional data words 50B through 50D.

The data in the functional data packet 46 is distributed over the fields 56 of the one or more functional data words 50B through 50D that contain only functional data.

The functional data words 50B through 50D do not contain the refresh indicator 44 or the result of the integrity test 48. The identifier of each word 50B through 50D identifies to which capsule 40 the functional data contained in field 56 of word 50B through 50D belongs.

The integrity check result 48 of each capsule 40 is issued on at least one integrity check word 50E, 50F, advantageously on two integrity check words 50E, 50F, when it contains thirty-two bits, while the field 56 of each word 50E, 50F contains only 19 bits.

The capsule 40 thus created is then transferred via the transfer link 18 by spreading it over several words 50A through 50F, to accommodate the transfer protocol present in the aircraft 12.

To this end, with reference to FIG. 1, the first data producer system 14, includes a module 70 for producing functional data 46 and associating it with a capsule identifier 42 40 and with a refresh indicator 44, a module 72 for calculating an integrity check result 48 established on the identifier 42, the refresh indicator 44, and the data packet 46 at each processing of functional data, and a module 74 for formatting the data for transfer via the transfer link 18.

The data production module 70 is able to generate functional data as defined above or retrieving functional data applicable to other aircraft systems via an application layer. The functional data is generated at successive moments, on request or at a predefined functional data generation frequency.

The functional data is distinct from the transport data (such as word identifier) required to implement the transfer link 18.

The data production module 70 is thus able to create a functional data packet 46 at each data production, of generally identical size for each data production. It is able to associate an identifier 42 with each functional data packet 46 processed, making it possible to identify the functional content of the functional data packet 46, its producer, and the membership of the functional data packet 46 to a capsule 40, using a mapping table.

As noted above, the identifier 42 further advantageously defines the size of the capsule 40, the size of the data packet 46, and the position of the integrity checksum 48 using the mapping table.

The data production module 70 is further able to relate a refresh indicator 44 to each functional data production, independently of the transmission frequency via the link 18. The refresh indicator 44 ensures that the data transmitted via the transfer link 18 is indeed valid data that has been refreshed. The refresh indicator 44 is coded on a determined number of bits, between 8 and 32, for example.

In the case of an incremental counter, the refresh indicator 44 is able to reset to null when the refresh indicator maximum has been reached.

The integrity check result calculation module 72 is able to build a memory representation 80 of the identifier 42, the refresh indicator 44, and the data packet 46 at the application layer, independent of the transport layers. An example of a memory representation 80 is shown in FIG. 5, which corresponds to a transport in the form of words 50.

Figure 5:
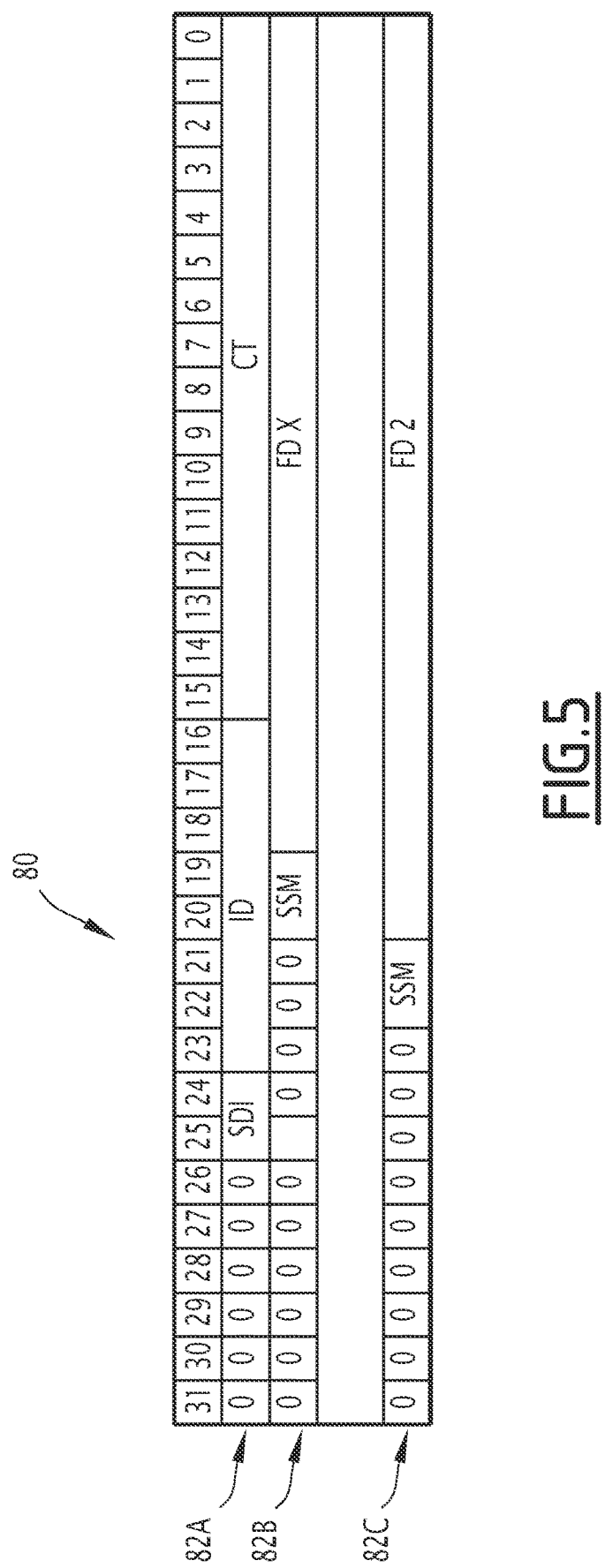
FIG. 5 is a view of a memory representation of a sequence of words forming a capsule, in order to implement an integrity test.

With reference to FIG. 5, the bits intended for the identifier and/or refresh indicator word 50A and the data words 50B through 50D on which the capsule 40 is transmitted are distributed as rows, with each row corresponding to a word (ARINC429 word, for example, in the case of an ARINC429 link) in a table having a number of columns corresponding to the number of bits in each word.

The bits specific to the transmission protocol in each word 50A through 50D are intentionally forced to a selected bit, such as a null bit, in the memory representation 80.

For example, in the first row 82A of the table in the memory representation 80 corresponding to the identifier and/or refresh indicator word 50A, only the bits for the identifier 42 and the refresh indicator 44 are retained at their value. The same is true for each functional data transport word 50B to 50D corresponding to the lines 82B to 82D, in which the bits corresponding to the word identifier, the SDI field, and the parity calculation, are voluntarily forced to a chosen bit, a null bit in this case.

Only the functional data 46, the identifier 42, and the refresh indicator 44 are retained in the memory representation 80.

Thus, the memory representation 80 makes it possible to test the integrity of the identifier 42 and refresh indicator 44, using the first line 82A of the representation, and also the integrity of the functional data packet 46 distributed on the lines 82B through 82D, by incorporating the data validity fields 58.

Once this memory representation 80 is constructed, the integrity result calculator module 72 is able to implement a checksum calculation and/or cyclic redundancy code, as defined above.

For example, to ensure good reliability of the integrity check, the integrity calculation result 48 is obtained by a MIL-STD-1760 checksum, or by a CRC-32K/6.4 cyclic redundancy code. The check result is encoded as thirty-two bits, in this example.

The formatting module 74 is then able to emit each capsule 40 corresponding to a functional data production, in the form of a plurality of words 50A to 50F, as described previously, according to the chosen data transmission protocol.

In particular in the case of an ARINC429 type link, the identifiers of the words 50A to 50F corresponding to a given capsule 40 are advantageously generated according to predefined semantics, so that if the words 50A to 50F are transmitted in disorder, or if other words 50G not belonging to the capsule 40 are interposed between the words 50A to 50F of the capsule 40 in a discontinuous manner, the capsule 40 can be reconstituted by the data consumer system 16 based on the predefined semantics.

The data consumer system 16 includes a module 90 for receiving and processing each capsule 40, a module for verifying the integrity 92 of the capsule 40, and a module 94 for verifying the validity of the data of the capsule 40.

The capsule reception module 90 is able to reconstitute each capsule 40, in particular by identifying the various words 50A to 50F of the capsule 40 received via the transfer link 18 via their identification field 52.

Once the capsule 40 is reconstituted, it is able to extract the identifier 42, the refresh indicator 44 and the data packet 46 corresponding to the capsule 40.

The capsule reception module 90 is able to perform an authentication check of the data producer system 14 by verifying whether the received data really comes from the expected data producer system 14, from the identifier 42.

Also from the capsule identifier 42, and in the case of a capsule 40 of fixed size, the capsule reception module 90, with the help of the same mapping table as that of the data producer system 14, is able to know the size of the capsule 40 and the position of the refresh indicator 44, the functional data packet 46 and the integrity check sum 48 within the capsule 40.

The integrity check module 92 is able to reconstruct the same memory representation 80 as that constructed by the data producer system 14, from the data retrieved from the capsule 40 that was transferred over the transfer link 18.

It is able to apply the same algorithm as that implemented by calculation module of the integrity result 72 of the data producer system 14 to calculate a new integrity check result for the received data, including the identifier 42 of the capsule 40, the refresh indicator 44 and the functional data packet 46.

The integrity verification module 92 is able to determine that the capsule 40 comprising the identifier 42, the refresh indicator 44 and the data packet 46 is in a integrity state if the new integrity check result calculated from the received data is identical to the integrity check result 48 calculated by the second data producer system 14, extracted from the capsule 40.

It is able to determine that the capsule 40, including the identifier 42, the refresh indicator 44 and the data packet 46 is in a corrupted state if the new integrity check result calculated from the received data is different from the integrity check result 48 calculated by the data producer system 14.

Once the integrity of the refresh indicator 44 has been confirmed, the validity verification module 94 is able to evaluate the data refresh contained in the capsule 40 by performing a refresh check based on the refresh indicator 44.

To this end, it is able to compare the refresh indicator 44 of each received capsule 40 with the counter 44 received from a previous capsule 40 to verify that the refresh indicator 44 has refreshed, by being incremented or decremented, for example, or by having followed an expected refresh trend.

The validity verification module 94 is able to calculate the refresh increment between the refresh indicator 44 of the received capsule 40 and the refresh indicator 44 of the capsule 40 received just before, for example.

In particular in the case of a counter or countdown, if the increment is unitary in absolute value, the validity verification module 94 is able to determine that the functional data present in the capsule 40 is indeed refreshed data and for placing the capsule 40 in an expected refresh state.

In the case of a frequency of transmission via the link 18 or of the data acquisition by the data consumer system 16 that is higher than the processing frequency of the functional data by the data producer system 14, the validity verification module 94 is able to authorize a null refresh increment on a determined number of capsules 40, calculated depending on the frequencies of processing, transmission or acquisition of the capsules 40, for example.

Beyond the determined number of capsules 40, if the refresh indicator 44 remains identical, it is able to pass the capsule 40 into an inadequate refresh state, because its data have not been refreshed.

Furthermore, when the processing and/or transmission frequency of the capsules 40 is higher than the acquisition frequency of the capsules 40, the validity verification module 94 is able to authorize a refresh increment higher than one.

In any case, the validity verification module 94 is able to memorize the refresh indicator of each capsule 40 just received, to make an increment calculation possible when the next capsule 40 is received.

It is also able to take into account the setting to null of the refresh indicator 44, when the latter reaches its maximum value.

Thus, depending on the increment calculated between the counters 44 of two successive capsules 40, the validity verification module 94 is able to determine if the functional data present in the capsule 40 are indeed refreshed data that can be used by the consumer system 16, and to place the capsule 40 in an expected refresh state. If, in contrast, the data is not refreshed or lacks intermediate data that has not been received, it is able to place the capsule 40 in an inadequate refresh state.

When the capsule 40 originates from the expected data producer system 14, is in the integrity state and in the expected refresh state, the functional data contained therein is considered valid and is then able to use by the consumer system 16, or for transmission to another aircraft system for use.

When a capsule 40 does not originate from the expected data producer system 14, or is in the corrupted state or an inadequate refresh state, the validity check module 94 is able to exclude the data from the capsule 40, which is considered invalid.

The validity check module 94 is advantageously able to implement a reset phase during a given reset time, corresponding to the reinitialization of a computer or a transient failure ending, for example.

In this case, as soon as a new capsule 40 is received, originating from the expected data producer system 14 and being in the integrity state, the validity verification module 94 is able to memorizing the new value of the refresh indicator 44 of this capsule 40. Then, it is able to retrieving the refresh indicator 40 of each new capsule 40 arriving, to determine a refresh increment. If the refresh increment reflects an expected refresh state, the validity check module 94 is able to switch the capsules 40 back to the valid state, after the predefined reset time.

In some cases, if the integrity or refresh failure affecting the data contained in the capsules 40 is varied, i.e. it occurs regularly or arbitrarily, the validity check module 94 is able to permanently stopping the reset and declaring the data transfer system 10 to be in default.

Thanks to the present disclosure just described, it is therefore possible to encapsulate functional data by securing it at the application level during each data production and not at the data transmission level, by integrating an identifier 42, a refresh indicator 44, and an integrity control result 48 in each capsule 40, which takes into account the identifier 42, the refresh indicator 44, and the functional data without taking into account the transmission layers.

Functional data encapsulated in this manner is therefore highly secure, regardless of the transmission protocol(s) used. This prevents the loss or misplacement of this data from producing critical consequences.

Such capsules 40 can be transferred via a data transfer link 18 that uses words 50, without affecting the syntax of the words 50, and by distributing the contents of the capsule 40 over different words 50A through 50F.

Updating the refresh indicator 44 each time functional data is developed ensures that a data refresh has occurred, not simply that a new data transmission has occurred.

Thus, it is possible to transmit digital aircraft data in a very secure manner, without the risk of data loss or error.

Figure 6:
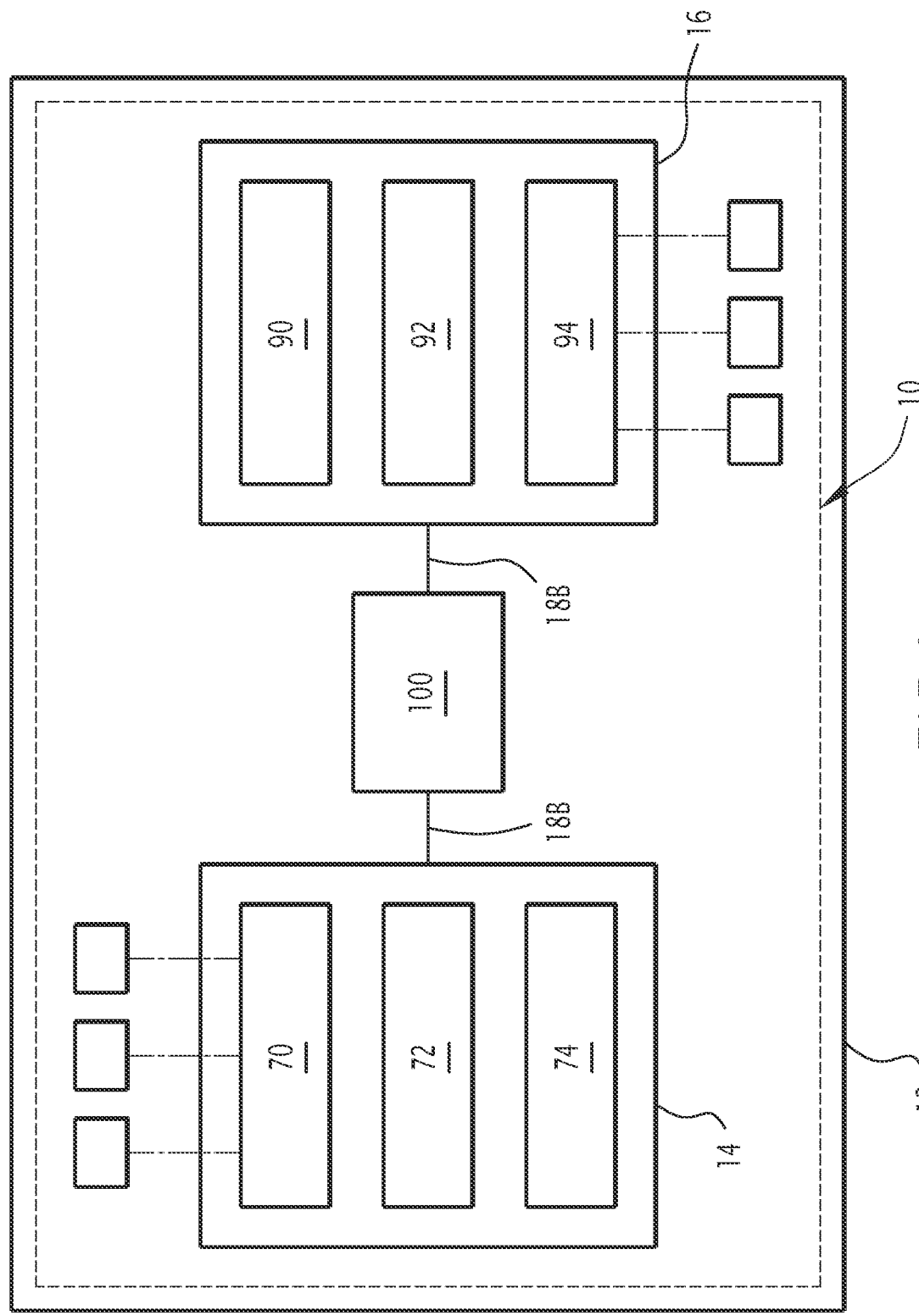
FIG. 6 is a view analogous to FIG. 1 of an alternative data transfer system according to the present disclosure.

In the variant shown in FIG. 6, the capsules 40 containing the data are passed through an intermediate system 100 between the data producer system 14 and the consumer system 16.

A first data transfer link 18A extends between the producer system 14 and the intermediate system 100, and a second data transfer link 18B extends between the intermediate system 100 and the consumer system 16.

Optionally, the capsules 40 are transferred according to a first transfer protocol across the first link 18A, and according to a second transfer protocol across the second link 18B.

However, regardless of which transfer protocol is used on the respective links 18A, 18B, the identifier 42, the refresh indicator 44, the functional data packet 46, and the integrity result 48 remain transmitted from the producer system 14 to the consumer system 16, allowing data integrity and refresh control by the consumer system 16.

In a variant, not shown, the capsule 40 is transmitted through a transmission protocol using messages consisting of a plurality of consecutive words 50, typically transmitted in atomic form, one after the other.

Generally, at least one word 50 of each message just contains information for managing the transmission protocol. The capsule 40 is then distributed over several words 50 of the same message containing no transmission protocol management information, unlike the protocol described above, in which each word 50 contains transmission protocol management information.

One or more words of the same message then contain the capsule identifier 42 and the refresh indicator 44, one or more words of the same message contain the functional data 46, and one or more words of the same message contain the integrity check result 48, calculated from the identifier 42, refresh indicator 44 and data packet 46 of the capsule 40.

In another variant (not shown), each capsule 40 is distributed across a plurality of messages by distributing capsule identifier 42, refresh indicator 44, functional data 46, and integrity check result 48 across words of the plurality of messages.

In another variant (not shown), the capsule 40 lacks any functional data 46. The capsule 40, as such, comprising the capsule identifier 42, the refresh indicator 44, and the integrity check result 48 on the identifier 42 and on the refresh indicator 44 is then the equivalent of a signal for triggering or validating an action. The data transmitted by the capsule 40 is then the presence of the capsule 40, or not.

What is claimed is:

1. An aircraft data transfer system comprising:
   a data producer system configured to produce data at successive data production moments;
   at least one data consumer system configured to receive and to use the data produced by the data producer system,
   the data producer system or/and the at least one data consumer system being on board an aircraft; and
   a data transfer link between the data producer system and the at least one data consumer system;
   the data producer system being configured to generate a data capsule at each data production, each data capsule comprising an identifier of the data producer system, a refresh indicator updated at each data production, and an integrity check result of a data integrity check relating to at least the identifier and the refresh indicator,
   each data capsule being configured to be transferred to the at least one data consumer system via the transfer link,
   the at least one data consumer system being configured to retrieve each data capsule to extract the identifier, the refresh indicator, and the integrity check result and to check data integrity in the data capsule by establishing a new integrity check result from at least the identifier and the refresh indicator retrieved from the data capsule and by comparing the new integrity check result to the integrity check result retrieved from the data capsule, the data capsule being in an integrity state when the new integrity check result matches the integrity check result retrieved from the data capsule,
   wherein the transfer link implements a word-generating transfer protocol, each data capsule being issued using a plurality of words,
   wherein the data capsule is transmitted over a plurality of distinct words by distributing the identifier of the data producer system, the refresh indicator and the result of the data integrity check into fields of the plurality of distinct words.

2. The transfer system according to claim 1, wherein each data capsule comprises a functional data packet, the integrity check result of the data capsule relating to at least the identifier, the refresh indicator and the functional data packet, the at least one data consumer system being configured to extract the functional data packet and to check the data integrity of the data capsule by establishing a new integrity check result from at least the identifier, the refresh indicator and the functional data packet.

3. The transfer system according to claim 1, wherein the at least one data consumer system is configured to compare the identifier received in each data capsule to a predefined identifier based on a semantic or a mapping table, to deduce at least one content characteristic of the data capsule.

4. The transfer system according to claim 3, wherein the data producer system issues data capsules of fixed size, the at least one data consumer system being configured to determine a size of the data capsule, a size and/or position of the identifier, the refresh indicator, or/and the integrity check result in the data capsule, from a semantic or mapping table linking the predefined identifier to the size of the data capsule, the size and/or position of the identifier, the refresh indicator, and/or the integrity check result in the data capsule.

5. The transfer system according to claim 1, wherein the at least one data consumer system is configured to determine a refresh increment for each data capsule received from the refresh indicator of the data capsule and from the refresh indicator of a previously received data capsule, the at least one data consumer system being configured to determine a refresh state of the data capsule between an expected refresh state and an inadequate refresh state depending on the refresh increment, and depending on a capsule generation frequency, a capsule transfer frequency and/or a capsule receiving frequency.

6. The transfer system according to claim 5, wherein the at least one data consumer system is configured to verify from the capsule identifier that the data producer system that issued the data capsule is a data producer system expected to issue the data capsule, the at least one data consumer system being configured to place the data capsule in a valid state for use of data contained in the data capsule when the data capsule is from the expected data producer system, in the integrity state and in the expected refresh state.

7. The transfer system according to claim 5, wherein the at least one data consumer system is adapted to place into an invalid state a data capsule that is not from an expected data producer system, which is not in the integrity state or which is not in the expected refresh state, and to keep in the invalid state data capsules that follow a data capsule placed into the invalid state, the at least one data consumer system being configured to return at least one data capsule, following a plurality of capsules held in the invalid state, into the valid state when the data capsules held in the invalid state are from the expected data producer system, in the integrity state and in the expected refresh state for a predefined reset period.

8. The transfer system according to claim 1, wherein the plurality of words includes:
   at least one identification word comprising the identifier and/or the refresh indicator; and
   at least one integrity check word containing the integrity check result.

9. The transfer system according to claim 8, wherein the plurality of words comprises at least two separate integrity check words, each integrity check word containing a part of the integrity check result.

10. The transfer system according to claim 1, wherein the data producer system is configured to process the integrity check result by adopting a memory representation from data to be distributed in the words intended to transfer the data capsule, the at least one data consumer system being configured to reconstitute the memory representation processed by the data producer system from the data retrieved from the words of the data capsule.

11. The transfer system according to claim 10, wherein each word includes transfer protocol characteristic fields, at least some of the data in the transfer protocol characteristic fields being substituted or deleted in the memory representation.

12. A data producer system configured for a data transfer system of an aircraft, the data producer system being configured to generate data at successive moments;
   the data producer system is configured to generate a data capsule at each data production, each data capsule comprising an identifier of the data producer system, a refresh indicator updated at each data production, and a result of a data integrity check relating to the identifier, the refresh indicator;
   each data capsule being configured to be transferred to a data consumer system via a transfer link,
   wherein the data capsule is transmitted over a plurality of distinct words by distributing the identifier of the data producer system, the refresh indicator and the result of the data integrity check into fields of the plurality of distinct words.

13. A data consumer system configured for use in a data transfer system of an aircraft, the data consumer system being configured to receive data capsules, each data capsule including a data producer identifier, a refresh indicator updated at each data production and an integrity check result of a data integrity check on at least the identifier and the refresh indicator;
   each data capsule being configured to be transferred to the data consumer system via a transfer link;
   the data consumer system being configured to retrieve each data capsule to extract the identifier, the refresh indicator, and the integrity check result, and to check the integrity of the data of the data capsule by establishing a new integrity check result from at least the identifier, the refresh indicator retrieved from the data capsule and by comparing the new integrity check result to the integrity check result retrieved from the data capsule, the data capsule being in an integrity state when the new integrity check result matches the integrity check result retrieved from the data capsule,
   wherein the data capsule is transmitted over a plurality of distinct words by distributing the identifier of the data producer system, the refresh indicator and the result of the data integrity check into fields of the plurality of distinct words.

14. A method for transferring aircraft data comprising:
   generating data at successive data production moments via a data producer system;
   transferring the data between the data producer system and at least one data consumer system via a data transfer link;
   receiving via the at least one data consumer system data produced by the data producer system and using the data produced by the data producer system after integrity checking,
   the data producer system or/and the at least one data consumer system being on board an aircraft;
   at each data production, generating, via the data producer system, a data capsule, each data capsule comprising an identifier of the data producer system, a refresh indicator updated at each data production, and a data integrity check result relating to the identifier and the refresh indicator;
   transferring each data capsule to the data consumer system via the transfer link;
   retrieving each data capsule via the at least one data consumer system to extract the identifier, the refresh indicator, and the integrity check result;
   checking the integrity of the data in the data capsule via the at least one data consumer system by establishing a new integrity check result from at least the identifier and the refresh indicator retrieved from the data capsule and by comparing the new integrity check result to the integrity check result retrieved from the data capsule; and
   assigning the data capsule an integrity status when the new integrity check result matches the integrity check result retrieved from the data capsule,
   wherein the data capsule is transmitted over a plurality of distinct words by distributing the identifier of the data producer system, the refresh indicator and the result of the data integrity check into fields of the plurality of distinct word.

15. The method according to claim 14, further comprising determining, via the at least one data consumer system, a refresh increment for each data capsule received from the refresh indicator of the data capsule and from the refresh indicator of a previously received data capsule, and the at least one data consumer system determining a refresh state of the data capsule, between an expected refresh state and an inadequate refresh state depending on the refresh increment and on a capsule generation frequency, a capsule transfer frequency and/or a capsule receiving frequency.

16. The method according to claim 15, comprising verifying, via the at least one data consumer system, from the identifier that the data producer system that issued the data capsule is the data producer system expected to issue the data capsule and placing the data capsule in a valid state for use of the data therein when the data capsule is from the expected data producer system, in an integrity state and in the expected refresh state.

* * * * *